US006814115B2

(12) United States Patent
Ostrovskis

(10) Patent No.: US 6,814,115 B2
(45) Date of Patent: Nov. 9, 2004

(54) SPIKE FOR MOTOR VEHICLE TIRES INCLUDING OUT-OF-ROUND TIP AND OUT-OF-ROUND ROOT AND UPPER PART IN TWISTED RELATION

(75) Inventor: Allan Ostrovskis, Gislaved (SE)

(73) Assignee: Continental Aktiengesellschaft, Hannover (DE)

(*) Notice: Subject to any disclaimer, the term of this patent is extended or adjusted under 35 U.S.C. 154(b) by 23 days.

(21) Appl. No.: 09/978,793

(22) Filed: Oct. 18, 2001

(65) Prior Publication Data

US 2002/0050312 A1 May 2, 2002

(30) Foreign Application Priority Data

Oct. 18, 2000 (EP) .............................. 00122689

(51) Int. Cl.[7] .................. B29D 30/66; B60C 11/16
(52) U.S. Cl. ...................... 152/210; 156/114
(58) Field of Search ................. 156/114; 29/815; 152/208, 210, 211

(56) References Cited

U.S. PATENT DOCUMENTS

| 2,117,766 | A | * | 5/1938 | Kraft |
| 2,981,302 | A | * | 4/1961 | Barassi |
| 3,428,105 | A |   | 2/1969 | Grötsch et al. |
| 3,494,015 | A | * | 2/1970 | Eissele et al. |
| 3,618,194 | A | * | 11/1971 | Haviland |
| 4,809,756 | A |   | 3/1989 | Takahashi ............ 152/210 |
| 6,374,886 | B1 | * | 4/2002 | Eromaki |

FOREIGN PATENT DOCUMENTS

| DE | 1850309 | * | 4/1962 |
| DE | 2400999 | * | 7/1975 |
| FR | 2 438 552 |   | 5/1980 |
| GB | 1063936 |   | 4/1967 |
| JP | 62-20705 | * | 1/1987 |
| JP | 7-1606 | * | 1/1995 |
| RU | 2 152 318 C1 |   | 7/2000 |
| WO | WO 99/56976 | * | 11/1999 |

OTHER PUBLICATIONS

Official Action, dated Apr. 19, 2003, issued by the European Patent Office, for European Patent Application No. 00122689.3 (1 page).
Patent Abstracts of Japan, Application No. 05144696, Application Date Jun. 16, 1993.
EPO Search Report dated Mar. 9, 2001.
Patent Abstracts of Japan, vol. 011, No. 196, Jun. 24, 1987 & JP 62 020705, Jan. 29, 1987.
Patent Abstracts of Japan, vol. 1995, No. 4, May 31, 1995 & JP 07 001606, Jan. 6, 1995.

* cited by examiner

Primary Examiner—Steven D. Maki
(74) Attorney, Agent, or Firm—Smith, Gambrell & Russell, LLP

(57) ABSTRACT

A spike for the running surface of a motor vehicle tire, especially a snow tire, with, as seen from above, an out-of-round, elongated, plate-like spike root (2, 2a), the greatest extension of which defines a longitudinal axis (7a), and an out-of-round, elongated upper part (4, 5) of the spike, the greatest extension of which defines a longitudinal axis (6a). In order to be enabled to accept even greater forces from below, the spike root (2, 2a) and the upper part (4, 5) of the spike are twisted in relation to each other, so that the longitudinal axis (6a) of the upper part (4, 5) of the spike encloses an angle (15, 15a) varying from zero with the longitudinal axis (7a) of the spike root (2,2a).

15 Claims, 4 Drawing Sheets

SPIKE FOR MOTOR VEHICLE TIRES INCLUDING OUT-OF-ROUND TIP AND OUT-OF-ROUND ROOT AND UPPER PART IN TWISTED RELATION

BACKGROUND OF THE INVENTION

The invention pertains to a spike for motor vehicle tires, especially for snow tires of automobiles. In order to make it possible for the spike to accept the maximal force from below, e.g., a frozen or snowy street, German Utility Model No. 1,850,309 teaches that the spikes in top view (i.e., in the radial view from the outside to the inside) should be out-of-round, i.e., flat or flat-oval.

Each spike contains a plate-like root, which serves to anchor the spike in the tire in the vicinity of the upper radial ply. The part of the spike that does not form the root is hereinafter called the upper part of the spike. At least a part of the upper part of the spike protrudes out of the running surface of the tire. The root of the spike can be just as out of round as the upper part of the spike. The upper part of the spike can have a thicker spike part, to which a tapered, pointed part is joined radially outward, which protrudes out of the rubber running surface.

BRIEF SUMMARY OF THE INVENTION

An objective of the invention is to improve a spike of the generic type in such a way that a tire equipped therewith is able to accept even larger forces from below. Another objective of the invention is to create a comparably improved tire and a third objective is to produce such a tire.

The above and other objectives of the invention can be achieved with a spike for the running surface of a motor vehicle tire, especially a snow tire with an out-of-round, longitudinal, plate-like spike root, whose greatest extension defines a longitudinal axis, and with an out-of-round, longitudinal spike upper part, whose greatest extension defines a longitudinal axis, characterized in that the spike root and the spike upper part are twisted in relation to each other, so that the longitudinal axis of the spike root together with the longitudinal axis of the spike upper part encloses an angle varying from zero.

Preferably, the angle enclosed by the two longitudinal axes is between 65° and approximately 115°, and more preferably essentially 90°. In addition, preferably a longitudinal extension of the thicker part is essentially the same as a width extension of the root. It is also preferred that the upper part consists of a thicker spike part and a tip sitting thereon, and the tip has an out-of-round cross section, while a longitudinal axis of the tip is oriented essentially parallel to the longitudinal axis of the thicker part.

In another aspect of the present invention, there is provided a snow tire for motor vehicles with a running surface having a plurality of protruding spikes, each with an upper part, protruding at least in part from the running surface and anchored in the tire by means of a root, which are distributed over the width and the circumference of the running surface.

Preferably the spikes are arranged in the middle (M) of the running surface, the longitudinal axes of the roots are essentially oriented in the circumferential direction of the tire and the longitudinal axes of the upper parts are essentially axial. In addition, it is preferred that the edge areas (S) of the running surface of the tire, spikes are arranged, in which the longitudinal axes of the root and the spike upper part enclose an angle that varies from 90°. It is also preferred that the spikes anchored in the running surface have several different configurations of the roots.

Furthermore, yet another aspect of the invention provides a process for producing a snow tire with a running surface, as described above, and with spikes, as described above, in which the spikes, after completion of the formation of the blank running surface, are shot, preferably while the running surface is still unvulcanized, into the running surface, wherein the injection pipes, in which the spikes are accelerated prior to the impact on the periphery of the running surface, have such a clear cross section that this cross section surrounds the top view of each of the spikes to be mounted with slight play, in order to guide the spike securely free of torsion and seat it in the proper angular position.

With the design of the root plate and the upper part of the spike, each with oblong outline and the approximately right-angled (65–115°) orientation of both longitudinal axes, the buckling of the spike can be greatly reduced, which improves the ability to accept force from below. Surprisingly, the higher burden of the thusly oriented spike root itself and its contact with the surrounding rubber, especially the upper radial ply, has been shown to be unproblematical.

The longitudinal axis of the plate-like root of a spike according to the inventions, encloses with the longitudinal axis of the upper part, an angle greater than zero, preferably 65–115°, ideally 90°.

The upper part of the spike is conveniently configured in the middle of the running surface such that the longitudinal axis of the approximately oval or ellipsoidal top view of the spike approximates an axial line. In this manner, this running surface area can transfer the greatest forces in the circumferential direction, which shortens the braking distance and improves traction (thrust).

For most snow tires, it is nevertheless more important to be able to transfer sufficient lateral force on ice as well, so as to ensure directional stability and curve tracking. Such forces can be best transferred by the sidewalls of the tires, the surface pressure of which intensifies on the outer side of the curve when driving in a curve. For this reason, the upper parts of the spikes are expediently installed in the sidewalls of the tires rotated at least so far with respect to the axial that the top view of the longitudinal axis describes an angle of at least 30° to the axial. For an automobile snow tire, an angle of 45° appears to be especially favorable; for a truck snow tire, even more, e.g., 60°, since the latter, due to the great wheel diameter and therefore the long contact surface, already has a good longitudinal force transfer capacity. In the case of a motorcycle tire, it is practical for the sidewall spikes to be arranged such that the top view longitudinal axis is exactly oriented in the circumferential direction so as to maximize the transfer capacity of the transverse forces. In the case of tires for trailers without brakes, the latter holds true for all spike positions.

For all spikes whose upper part is axially oriented, i.e., the longitudinal axis of the longitudinal top view of the spikes runs along an axial, as discussed in the penultimate paragraph, the optimal twisting angle between the upper part and the root is also 90°. The root is then oriented circumferentially in the finished tire and imparts to the spike the smallest possible deformation under forces in the circumferential direction.

For all spikes whose upper part is circumferentially oriented, i.e., the longitudinal axis of the longitudinal top view of the spikes runs in the circumferential direction, as discussed at the end of the penultimate paragraph, the optimal twisting angle between the upper part and the root is likewise 90°. In the finished tire, the root is then oriented axially and imparts to the spike the smallest possible deformation under forces in the axial direction.

For all spikes whose upper part is oriented diagonally, i.e., the longitudinal axis of the elongated spike top view runs at an angle greater than 0° and less than 90° to the circumferential, as discussed at the beginning of the penultimate paragraph, the optimal twisting angle between the upper part and the root is 90° only if the latter run precisely on the equator (zenith) of the tire, which is not preferred, however. In the finished tire, the root is then complementarily oriented diagonally to the circumferential direction, so that, e.g., when in a first rotational sense the upper part rotates some 30° to the circumferential direction, the root is oriented by 60° (or between about 90° to about 30°) in the inverse rotational sense to the circumferential direction.

For all spikes whose upper part is diagonally oriented and which lie outside the equator of the tire, the preferred location, the optimal twisting angle varies from 90°, all the more so, the more ball-like the running surface of the tire and the packet of radial plies are, the closer the spike is to the edge of the running surface, and the more the angle in which the top-view longitudinal axis of the upper part of the spike varies from the nearest "pure" angle, 0° or 90°. The findings calculated heretofore are interpreted as indicating that the longitudinal axis alignment for the spike root should encompass, with the circumferential direction, an angle more acute by a value X than would be represented by a 90° twist between the upper part and the root. This value X can be determined by the typical person skilled in the art by way of an FEM optimization (FEM=Finite Elements Method for calculating mechanical stresses and deformations); it can be as great as half the inclination angle to the circumferential direction.

In addition to better frictional contact with the surface below during operation, tires equipped with the spikes according to the invention provide the advantage that the flexing work of the spikes in the rubber of the running surface of the tire is reduced, since, due to the lengthening of the plate-like root of the spike and therefore the lever arm for receiving the pitching moment, all of the deformation ways are reduced. This reduces the heating of the running surface during operation and thus delays the aging of the rubber, which in turn explains why the tread separation tendency between the root of the spike and the lower rubber layer which is associated with the stiffer anchoring of the spikes leads to no damage even in continuous operation.

The invention is explained in greater detail below with references to the appended drawings of several embodiments.

DETAILED DESCRIPTION OF THE INVENTION

Figure 1:
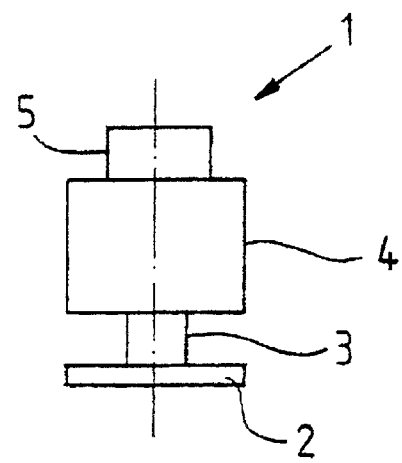
FIG. 1, is a schematic side view of a spike in the preferred embodiment of the present invention.
Figure 2:
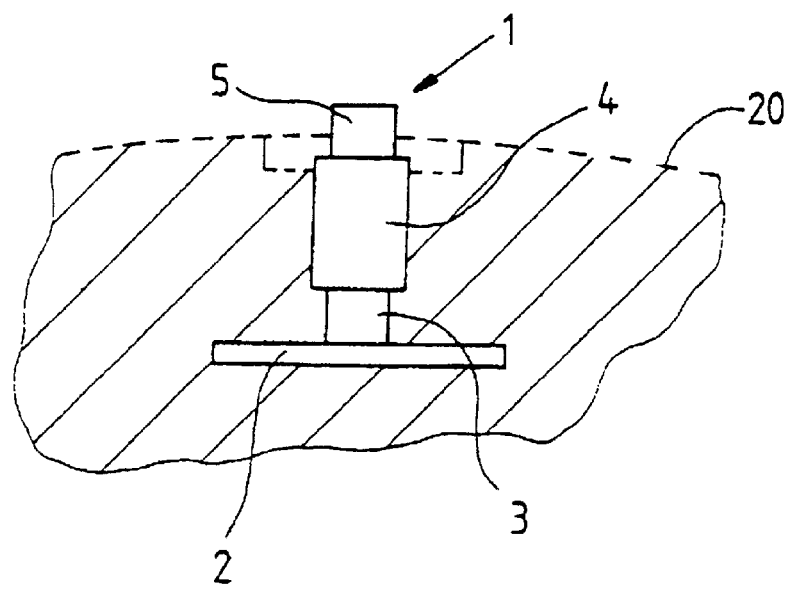
FIG. 2, is a schematic side view offset by 90° of the spike in FIG. 1 and shown in a tire.
Figure 3:
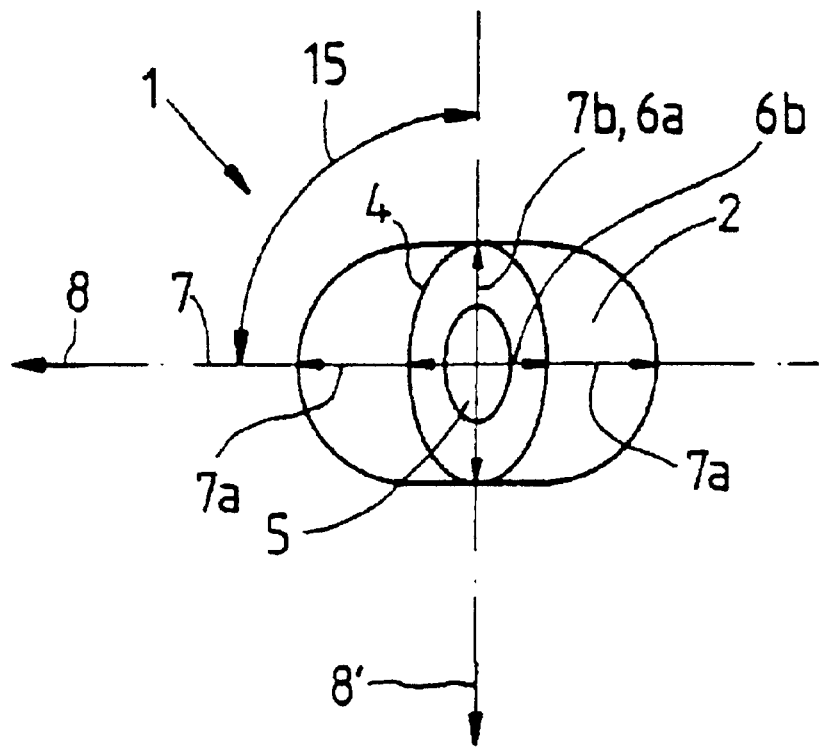
FIG. 3, is a schematic top view of the spike according to FIGS. 1 and 2.
Figure 4:
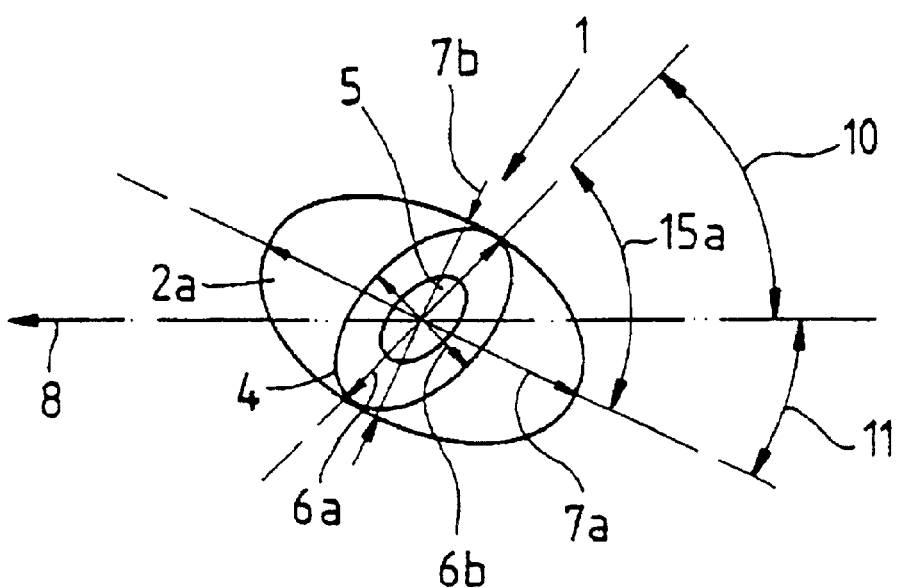
FIG. 4, is a schematic top view of another spike embodiment of the invention with a twist other than 90° between the upper part of the spike and the root of the spike.

FIGS. 1–3 belong to one and the same embodiment; FIG. 4 illustrates a variation thereof and replaces FIG. 3 for this second embodiment. In both embodiments, the spike (1) consists of a plate-like root (2), which is connected, preferably by a one-piece neck part (3), to an upper part (4, 5). The upper part preferably consists of a thicker spike part (4) and a spike tip (5) tapered with respect to it.

Spikes (1) according to FIGS. 1–4 are designed to be securely embedded in the rubber running surface of a tire, not depicted here, with the root (2) and optionally the neck part (3) or at least a portion of part (4) embedded above the uppermost radial ply, so that only a part of the upper part protrudes out of the running surface.

In both spike embodiments, the outline of the root (2) or (2a), which is lengthened, varies from the circular form. The outline is preferably rounded longitudinally, as both FIGS. 3 and 4 show. The form of the outline can be oval, as shown in FIG. 3 for the first embodiment, or elliptical, as illustrated in FIG. 4 for the second embodiment, or also Gothic, i.e., delineated by two identically sized, opposingly arched, intersecting, circular cutouts or otherwise elongated, e.g., in the form of a rounded rectangle.

The neck part (3) can also have a longitudinally rounded (out of round) outline differing from the depicted circular form. However, it can also be circular, as illustrated. Furthermore, it can be eliminated when the parts (3) and (4) are designed with identical cross section.

The upper part of the spike(1) as well, at least its thicker part (4), has an out-of-round longitudinal outline in both spike embodiments, as illustrated in FIGS. 3 and 4. Like the adjoining thicker part (4), the tapered tip (5) should, as FIG. 3 shows, preferably have an identically oriented elongated outline form. It is especially practical for both outlines of the parts (4) and (5) to be similar, e.g., ellipses (naturally differing in size) with the same eccentricity and alignment, as FIGS. 3 and 4 show.

In both spike embodiments, the longitudinal axis (6a) of the part (4) and, when present as in this instance, (5) is differently aligned than the longitudinal axis (7a) of the root (2) or (2a). In the case of the example in FIGS. 1–3, this angle of twist (15) is exactly 90°. In the second embodiment illustrated in FIG. 4, this angle of twist (15a) is 70°.

In relation to the circumferential direction (8) of a tire, the spike(1) can in principle be installed so that the longitudinal direction (7a) of the root (2) aligns with the circumferential direction (8). With such a manner of installation, which is particularly recommended for spikes according to the first embodiment arranged in the midsection of the running surface of a tire, the dimensions of the root (2) in the direction (8) of the circumference of the tire are especially large, whereby the buckling of the spike is especially slight and thus the flexing work of the rubber in the vicinity of the spike remains minimal as the tire rolls.

Briefly, the great length of the root (2) in the direction in which the spike otherwise threatens to tilt, contributes to the fact that the increased forces absorbed by the eccentric upper part (4, 5) are directed more stiffly into the tires, so that the tilting of the spike under load application is reduced.

In the midsection of the running surface, the favored longitudinal extension (6a) of the upper part (4) is directed approximately at a right angle to the circumferential direction (8); briefly, the upper parts (4, 5) of the spike there preferentially run axially. Hereby, under normal straight-ahead driving conditions, the spike(1) can, by virtue of its expanded cross section, absorb more longitudinal forces (braking, accelerating) from below. Here it is advantageous when the maximal diameter (6a) of the upper part (4) agrees with the maximal diameter (7b) of the root (2). The preferred elongated configuration of both the root (2) and the upper part (4) is realized with an elongated oval outline as shown in FIG. 3.

Shown in FIG. 4 is a somewhat different outline form, in which the basic elongated rounded outline form is nevertheless retained.

A first difference between the embodiment according to FIG. 4 and that according to FIG. 3 is the fact that the root (2a) in FIG. 4 is elliptical in outline, while the root (2) according to FIG. 3 is of oval outline.

A second difference between the embodiment according to FIG. 4 and that according to FIG. 3 is the fact that the longitudinal axis (6a) of the thicker part (4) of the spike and the longitudinal axis (7a) of the root (2) enclose an angle (15a) varying from 90°. Here the angle is 70° and should preferably be between 65° and 115°. This twist varying from 90° has advantages for spikes which are to be located in the sidewalls of tires with diagonal orientation of the longitudinal axis (6a) in the top view of the upper part (4, 5) of the spike.

In order to illustrate this, the circumferential direction (8) of the tire, in which the spike (1) in question is to be preferentially installed, is indicated in broken lines horizontally with respect to the drawing sheet in both FIGS. 3 and 4.

The upper part (4, 5) of the spike improving the downward transfer of force in FIG. 4 is rotated to the left out of the circumferential direction (8) at an angle (10) of 45° (while in FIG. 3 it is rotated out of the circumferential direction (8) at an angle of 90°, i.e., it runs axially). Even if here as well the twist between the root (2) and the upper part (4, 5) was 90°, which would also be possible, then the longitudinal axis (7a) of the root (2a) of the spike would be rotated by 45° to the right out of the circumferential direction (8); it (7a), however, is rotated out of the circumferential direction (8) to the right by only an angle (11) of 25°, which leads to a more favorable load because of the flattening of the two-dimensionally curved running surface of the tire. In order to realize this advantage on the finished tire, this spike(1) must be produced with an angle of twist (15a) of only 70° instead of 90° (see reference number 15 in FIG. 3).

Figure 5:
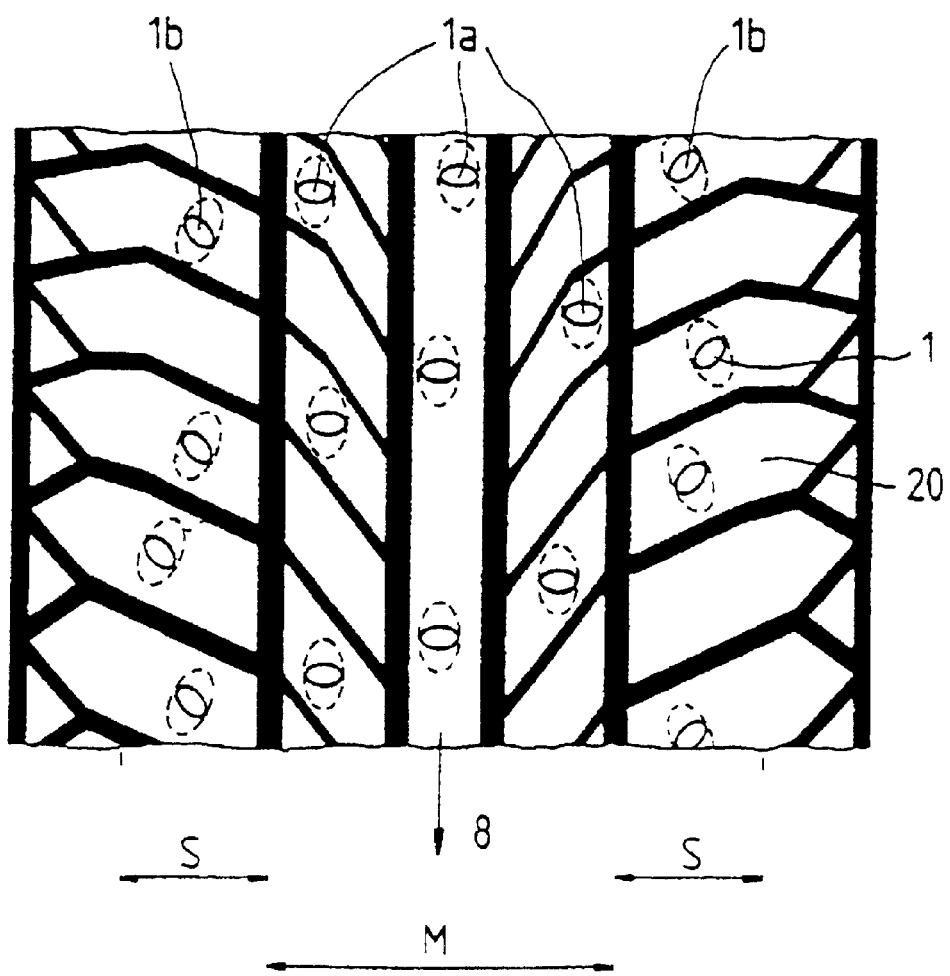
FIG. 5, is a schematic top view of the surface of a tire with spikes.

As FIG. 5 shows, there are, preferably shot into a running surface (20) of a tire, both spikes (1a) with right-angled twist of the longitudinal axes (6a) and (7a) of upper part and root and spikes (1b) with twist of the longitudinal axes (6a) and (7a) of upper part and root varying from 90°. Here the first spikes (1a), as illustrated, are conveniently installed in the midsection (M) of the running surface and practically arranged such that the longitudinal axes (7a) of the root are oriented in the circumferential direction (8), so that the longitudinal axes (6a) of the upper part are axially oriented and thus serve the transfer of the longitudinal forces. On the other hand, the other cited spikes (1b), also as shown here, are conveniently installed in the two sidewalls (S) of the running surface and are in fact oriented such that the longitudinal axes (7a) of the root are located at an approximate angle of 25° to the circumferential direction (8) and the longitudinal axes (6a) of the upper part run diagonally at an angle of approximately 45° to the circumferential direction (8) and thus also serve the transfer of the transverse forces as well as the transfer of the longitudinal forces.

Corresponding to the defined rotational direction of the depicted tire profile, the spiking of the sidewalls (S) is also configured in relation to the rotary direction. This is based on the realization that, for driving safety, braking capacity is more important than traction and acceleration capacity and that good tracking is still more important when braking than when accelerating. The defined rotationally directed spiking is achieved in that in the one tire sidewall (S) the longitudinal axis (6a) of the upper part is twisted from the right out of the circumferential direction (8) and in the opposite tire sidewall (S) with spikes with the longitudinal axis (6a) twisted from the left out of the sidewall (8). Thereby, one realizes an optimal force absorption in both straight-ahead driving and curved travel to the left or the right and the grade sequencing of the safety aspects is perfectly observed.

However, such a tire is more expensive than an ordinary one, not only because spikes according to the invention are more costly to produce, are somewhat more difficult to install and require effort for proper orientation, but also because, for this most refined embodiment according to FIG. 5, three different spike types must be produced and stocked, namely such with 70° twist to the right, such with 90° twist and such with 70° twist to the left.

In all cases, the increased forces absorbed from below are dependably transferred more efficiently into the running surface and the ply packet by the roots (2) oriented more in the rotational direction than with a 90° twist.

Differing from the ordinary spikes still used on spike tires with both circular root and circular upper part, the right orientation relative to the circumferential direction of the tire must be prescribed for each spike in the seating of the spikes according to the invention. To this end, the spikes should be directed by a guide system prior to their reaching the running surface, so that they can be shot into the tire in the proper orientation (in the prescribed angles 0°, 90° or 45° or in any desired angles). The essential components of such a system are pipes out-of-round in cross section.

To the extent, as wished, the width axis (7b) of the root (2) or (2a) is longer than or of the same length as the longitudinal axis (6a) of the upper part (4, 5), this is achieved by a cross-sectional configuration of the injection pipe encasing the respective root of the spike with only light play, and optionally of the feed pipes as well.

Figure 6:
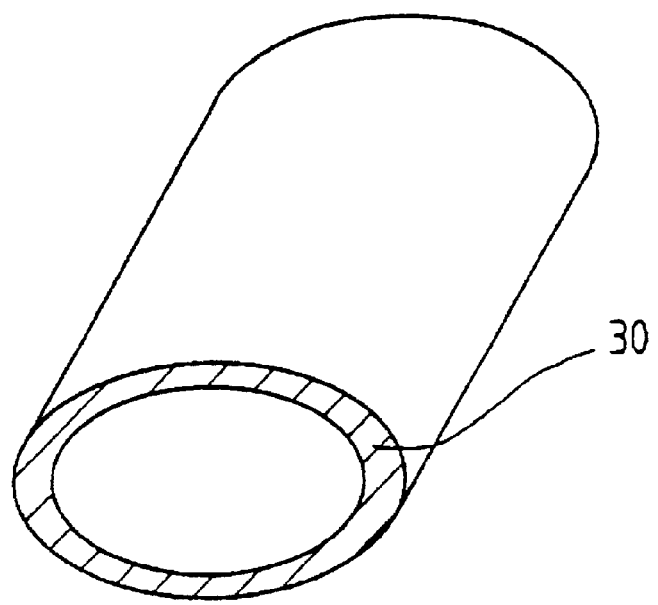
FIG. 6, is a schematic cross-section view of a pipe for shooting spikes according to the invention into the running surface of a tire.

FIG. 6 shows such a pipe (30) with an ellipsoidal cross-sectioned surface, whereby said pipe is suitable as a device for installing spikes according to FIG. 4 independently of the angle of twist between the upper part and the root of the spike to be installed. For seating spikes according to FIG. 3, a pipe of oval cross section is accordingly preferred.

However, when on the spikes to be mounted the axis (7b) is smaller than the axis (6a), the alignment is achieved with a configuration of the injection pipe approximating the form of a four-leaf clover. The feed pipes can also be so configured. Here it is important that the clear cross section of the pipe agree as precisely as possible with the outline of the type of spike to be mounted, while being nowhere narrower than this outline, in order to avoid jamming.

It will be seen from the foregoing that the spike upper part (4) is concentric with respect to the spike root (2). Also, the drawings show that the tip (5) is concentric with respect to the thicker spike part (4).

In the following part of the description, all of the reference numerals used in the figures are listed and partially explained in greater detail:

1 spike according to the invention, in general 1a spike (1) in FIG. 5 with mutually perpendicular orientation of the longitudinal axes (6a) and (7a) of the upper part and the root 1b spike (1) in FIG. 5 with differing (twisted) orientation varying from 90° of the longitudinal axes (6a) and (7a) of the upper part and the root 2 root of (1) in the FIGS. 1–3 and 5

2a root of (1) in FIG. 4

3 neck part of (1) between (2) and (4)

4 thicker part of (1); when (5) is present, this part comes into contact with the street only after some tire wear 5 tip of (4); such a sharpening is not necessary, albeit preferred; when in the course of tire wear, (5) is worn down, such a sharpening, which could also be called "chamfering" or "breaking edges", repeatedly takes place on (4) by way of a concentration of the wear volume at the border between the end face and the lateral surface of (4); in the new state of the spike, (5) is most meaningfully so configured as it ultimately ends up in use anyway, since this leads to the longest tire and street lifespan 6a longitudinal axis of the thicker part (4) of the entire upper part (4, 5) of a spike (1) according to the invention, i.e., the longest possible straight line within the top view of the upper part or the maximal diameter through the upper part of (1) or the greatest extension of (4) or (4) and (5), all three wording variants intended to mean the same thing 6b width axis of the thicker part (4) or the entire upper part (4, 5) of a spike (1) according to the invention, i.e., the straight line within the top view of the upper part, which runs perpendicularly to (6a) or the minimal diameter through the upper part of (1) or the shortest extension of (4) or (4 and (5), all three wording variants intended to mean the same thing 7a longitudinal axis of the root (2, 2a) of the spike, i.e., the longest possible straight line inside the top view of the root or the maximal diameter through the root (2) of (1) or the greatest extension of (2), all three wording variants intended to mean the same thing 7b width axis of the root (2) or (2a) of the spike (1), i.e., the straight line inside the top view of the root, which runs perpendicularly to (7a), or the minimal diameter through the root of (1) or the shortest extension of (2), all three wording variants intended to mean the same thing 8 circumferential direction of the tire 10 the angle, by which the greatest diameter (6a) of the upper part (4, 5) is twisted out of the circumferential direction (8) of the tire (taken into account only in FIG. 4, since it varies from 90° only there)

11 the angle, by which the greatest diameter (7a) of the root (2a) is twisted out of the circumferential direction (8) of the tire (taken into account only in FIG. 4, since it varies from 0° only there)

15 angle of twist between (6a) and (7a) for the first embodiment, depicted in FIG. 3, being 90° there 15a angle of twist between (6a) and (7a) for the second embodiment, depicted in FIG. 4, being 70° there 20 running surface of a tire (FIG. 5)

30 injection pipe for mounting spikes according to the invention (see FIG. 6)

As used herein the term "motor vehicle" intends passenger cars, trucks, motorcycles, and trailers drawn by a motor vehicles.

Further variations and modifications will become apparent to those skilled in the art from the foregoing and are intended to be encompassed by the claims appended hereto.

Foreign priority application 00122689.3-2306 of Oct. 18, 2000 is relied on and incorporated herein by reference.

What is claimed is:

1. A spike for insertion into the running surface of a motor vehicle tire, comprising:
   an out-of-round, longitudinal, plate-like spike root, wherein the greatest extension of the spike root defines a longitudinal axis, and
   an out-of-round, longitudinal spike upper part, wherein the greatest extension of said spike upper part defines a longitudinal axis, said spike upper part being concentric with respect to said spike root, wherein
   the spike root and the spike upper part are twisted in relation to each other, so that the longitudinal axis of the spike root together with the longitudinal axis of the spike upper part encloses an angle varying from zero, wherein the upper part consists of a thicker spike part and a tip sitting thereon, and the tip has an out-of-round cross section, while a longitudinal axis of the tip is oriented essentially parallel to the longitudinal axis of the thicker part, said tip being concentric with respect to said thicker spike part and said root.

2. The spike according to claim 1, wherein the angle enclosed by the two longitudinal axes is between approximately 65° and approximately 115°.

3. The spike according to claim 2, wherein the angle enclosed by the two longitudinal axes is approximately 90°.

4. The spike according to claim 1, wherein a longitudinal extension of the thicker part is essentially the same as a width extension of the root.

5. A tire having a running surface, having a width and a circumference, for motor vehicles, said surface having a plurality of spikes according to claim 1, each spike anchored in the tire by means of the root and the upper part of each spike protruding at least in part from the running surface and, wherein the spikes are distributed over the width and the circumference of the running surface.

6. The tire according to claim 5, wherein spikes are arranged in a middle of the running surface such that, the longitudinal axes of the roots are essentially oriented in the circumferential direction of the tire and the longitudinal axes of the upper parts are essentially axial.

7. The tire according to claim 5, wherein, in an edge area of the running surface of the tire, spikes are arranged such that the longitudinal axis of the root and the longitudinal axis of the spike upper part enclose an angle that varies from each of 0° and 90°.

8. The tire according to claim 7, wherein, in said edge area of the running surface of the tire, spikes are arranged such that the longitudinal axis of the root are located at an approximate angle of 25° to the circumferential direction and the longitudinal axis of the upper part run diagonally at an angle of approximately 45° to the circumferential direction.

9. The tire according to claim 5, wherein the roots of the spikes anchored in the running surface have several different configurations.

10. A process for producing a snow tire having a running surface, comprising:
    injecting a plurality of spikes using injection pipes into the running surface, each of said plurality of spikes comprising:
    an out-of-round, longitudinal, plate-like spike root, wherein the greatest extension of the spike root defines a longitudinal axis, and
    an out-of-round, longitudinal spike upper part, wherein the greatest extension of said spike upper part defines a longitudinal axis, said spike upper part being concentric with respect to said spike root, further wherein the upper part consists of a thicker spike part and a tip sitting thereon, said tip having an out-of-round cross section, a longitudinal axis of the tip is oriented essentially parallel to the longitudinal axis of the thicker part, said tip being concentric with respect to said thicker spike part and said root, the spike root and the spike upper part are twisted in relation to each other, so that the longitudinal axis of the spike root together with the longitudinal axis of the spike upper part encloses an angle varying from zero, wherein each of the injection pipes, in which the spikes are accelerated prior to the impact on a periphery of the running surface, have such a clear cross section that this cross section surrounds the top of each of the spikes to be mounted with slight play, in order to guide the spike securely free of torsion and seat it in the proper angular position, and wherein in an edge area of the running surface of the tire, spikes are arranged such that the longitudinal axis of the root and the longitudinal axis of the spike upper part enclose an angle that varies from each of 0° and 90°.

11. The process according to claim 10, wherein the running surface of the tire is still unvulcanized when the spikes are injected into the running surface.

12. The process according to claim 10, wherein each of said plurality of spikes is anchored in the tire by means of the root and the upper part of each spike protrudes at least in part from the running surface and, wherein the spikes are distributed over a width and a circumference of the running surface.

13. The process according to claim 12, wherein spikes are injected in a middle of the running surface such that, the longitudinal axes of the roots are essentially oriented in the circumferential direction of the tire and the longitudinal axes of the upper parts are essentially axial.

14. The process according to claim 10, wherein in said edge area of the running surface of the tire, spikes are injected such that the longitudinal axes of the roots are located at an approximate angle of 25° to the circumferential direction and the longitudinal axes of the upper parts run diagonally at an angle of approximately 45° to the circumferential direction.

15. A snow tire having a running surface made by a process, comprising:

injecting a plurality of spikes using injection pipes into the running surface, each of said plurality of spikes comprising:

an out-of-round, longitudinal, plate-like spike root, wherein the greatest extension of the spike root defines a longitudinal axis, and an out-of-round, longitudinal spike upper part, wherein the greatest extension of said spike upper part defines a longitudinal axis, further wherein the upper part consists of a thicker spike part and a tip sitting thereon, said tip having an out-of-round cross section, a longitudinal axis of the tip is oriented essentially parallel to the longitudinal axis of the thicker part, said tip being concentric with respect to said thicker spike part and said root, the spike root and the spike upper part are twisted in relation to each other, so that the longitudinal axis of the spike root together with the longitudinal axis of the spike upper part encloses an angle varying from zero, wherein each of the injection pipes, in which the spikes are accelerated prior to the impact on a periphery of the running surface, have such a clear cross section that this cross section surrounds the top of each of the spikes to be mounted with slight play, in order to guide the spike securely free of torsion and seat it in the proper angular position, and wherein in an edge area of the running surface of the tire, spikes are arranged such that the longitudinal axis of the root and the longitudinal axis of the spike upper part enclose an angle that varies from each of 0° and 90°.

* * * * *